(12) United States Patent
Luo

(10) Patent No.: US 11,709,547 B1
(45) Date of Patent: Jul. 25, 2023

(54) SYSTEM FOR TRANSMITTING SIGNALS BETWEEN A BODY AND A VIRTUAL REALITY SPACE

(71) Applicant: Gangming Luo, Middle Vilage, NY (US)

(72) Inventor: Gangming Luo, Middle Vilage, NY (US)

( * ) Notice: Subject to any disclaimer, the term of this patent is extended or adjusted under 35 U.S.C. 154(b) by 0 days.

(21) Appl. No.: 17/709,865

(22) Filed: Mar. 31, 2022

(51) Int. Cl.
*G06F 3/01* (2006.01)
*G06F 3/14* (2006.01)

(52) U.S. Cl.
CPC ............... *G06F 3/14* (2013.01); *G06F 3/016* (2013.01)

(58) Field of Classification Search
None
See application file for complete search history.

(56) References Cited

U.S. PATENT DOCUMENTS

| 2012/0182135 A1* | 7/2012 | Kusuura | G06F 3/016 340/407.1 |
| 2017/0165567 A1* | 6/2017 | Walters | A63F 13/285 |
| 2022/0083140 A1* | 3/2022 | Ogita | G06F 3/011 |

* cited by examiner

*Primary Examiner* — Carl Adams
(74) *Attorney, Agent, or Firm* — Reising Ethington P.C.

(57) ABSTRACT

A system for transmitting signals between a body of a living being and a virtual reality space includes a wearable device configured to be worn on the body. The device provides haptic feedback to the body indicative of interactions between a virtual body and one or more virtual objects within the virtual reality space. The device includes a base affixed to the body, a container supported on the base, and a flow control device that controls flow of a mass between the container and a tank. A controller generates a flow control signal to control the flow control device responsive to an interaction between the virtual body and a virtual object within the virtual reality space. The container assumes an expanded state in which the container assumes a defined shape when the mass is present in the container and a contracted state in the absence of the mass.

22 Claims, 4 Drawing Sheets

SYSTEM FOR TRANSMITTING SIGNALS BETWEEN A BODY AND A VIRTUAL REALITY SPACE

BACKGROUND OF THE INVENTION a. Field of the Invention

This invention relates to a system for transmitting signals between a body of a living being and a virtual reality space. In particular, the invention relates to a system that provides feedback to a body indicative of interactions between a virtual body and one or more virtual objects within the virtual reality space.

b. Background Art

The use and prevalence of virtual reality systems is continuously increasing. Virtual reality systems are, for example, used in flight simulation, battlefield simulation, medical training and robotic surgery, games and other forms of entertainment. Virtual reality systems provide many benefits including reduced costs as compared to similar real-life experiences and the ability for users to practice or test various actions without the associated risks of taking those actions in real life. Virtual reality systems, however, can be relatively expensive to implement and are often very complex. The cost and complexity of existing systems often delays the adoption and use of such systems in various fields and/or reduces access to such systems.

The inventor herein has recognized a need for a system for transmitting signals between a body of a living being and a virtual reality space that will minimize and/or eliminate one or more of the above-identified deficiencies.

BRIEF SUMMARY OF THE INVENTION

This invention relates to a system for transmitting signals between a body of a living being and a virtual reality space. In particular, the invention relates to a system that provides feedback to a body indicative of interactions between a virtual body and one or more virtual objects within the virtual reality space.

A system for transmitting signals between a body of a living being and a virtual reality space in accordance with one embodiment includes a wearable device configured to be worn on the body of the living being. The wearable device is configured to provide haptic feedback to the body of the living being indicative of interactions between a virtual body and one or more virtual objects within the virtual reality space. The wearable device includes a base configured to be affixed to the body of the living being, a container supported on the base, and a flow control device configured to control flow of a mass between the container and a tank. The system further includes a controller configured to generate a flow control signal to control the flow control device responsive to an interaction between the virtual body and a virtual object within the virtual reality space. The container is configured to assume an expanded state in which the container assumes a defined shape when the mass is received within the container and a contracted state in which the container does not assume the defined shape when the mass is absent from the container.

A wearable device for providing haptic feedback to the body of the living being indicative of interactions between a virtual body and one or more virtual objects within a virtual reality space in accordance with one embodiment includes a base configured to be affixed to the body of the living being, a container supported on the base, and a flow control device configured to control flow of a mass between the container and a tank in response to a flow control signal generated in response to an interaction between the virtual body and a virtual object within the virtual reality space. The container is configured to assume an expanded state in which the container assumes a defined shape when the mass is received within the container and a contracted state in which the container does not assume the defined shape when the mass is absent from the container.

A system for transmitting signals between a body of a living being and a virtual reality space in accordance with the present teachings represents an improvement as compared to conventional systems. In particular, the system is made from relatively simple and inexpensive components thereby facilitating faster adoption and use of virtual reality systems in various fields and/or increased access to such systems.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
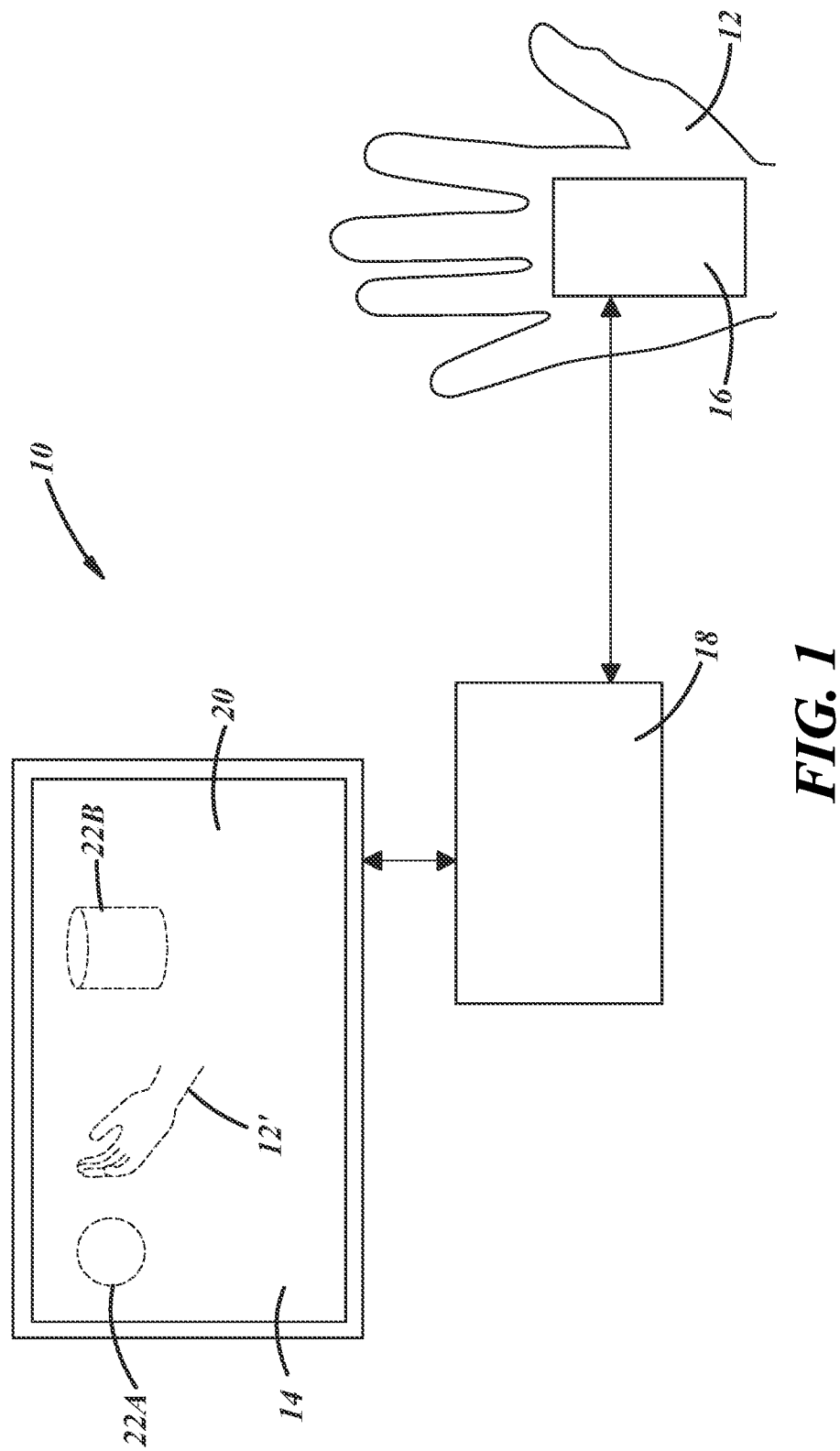
FIG. 1 is a diagrammatic view of one embodiment of a system for transmitting signals between a body of a living being and a virtual reality space.

Referring now to the drawings wherein like reference numerals are used to identify identical components in the various views, FIG. 1 illustrates one embodiment of a system 10 for transmitting signals between a body 12 of a living being and a virtual reality space 14. System 10 may include a wearable device 16, a controller 18, and a display 20.

Figure 2:
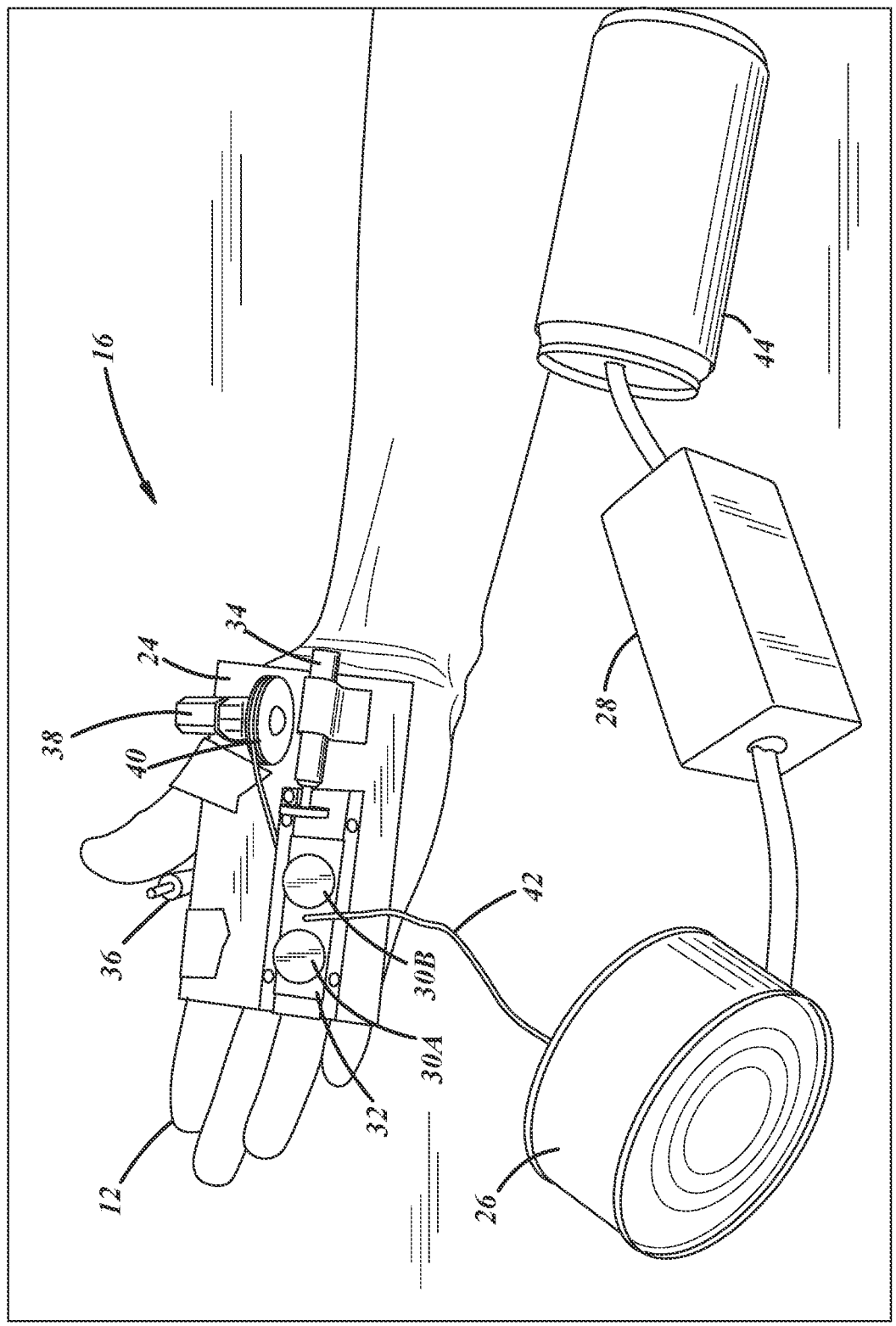
FIGS. 2-3 are perspective views of one embodiment of a wearable device for providing haptic feedback to the body of the living being indicative of interactions between a virtual body and one or more virtual objects within the virtual reality space in the system of FIG. 1.
Figure 3:
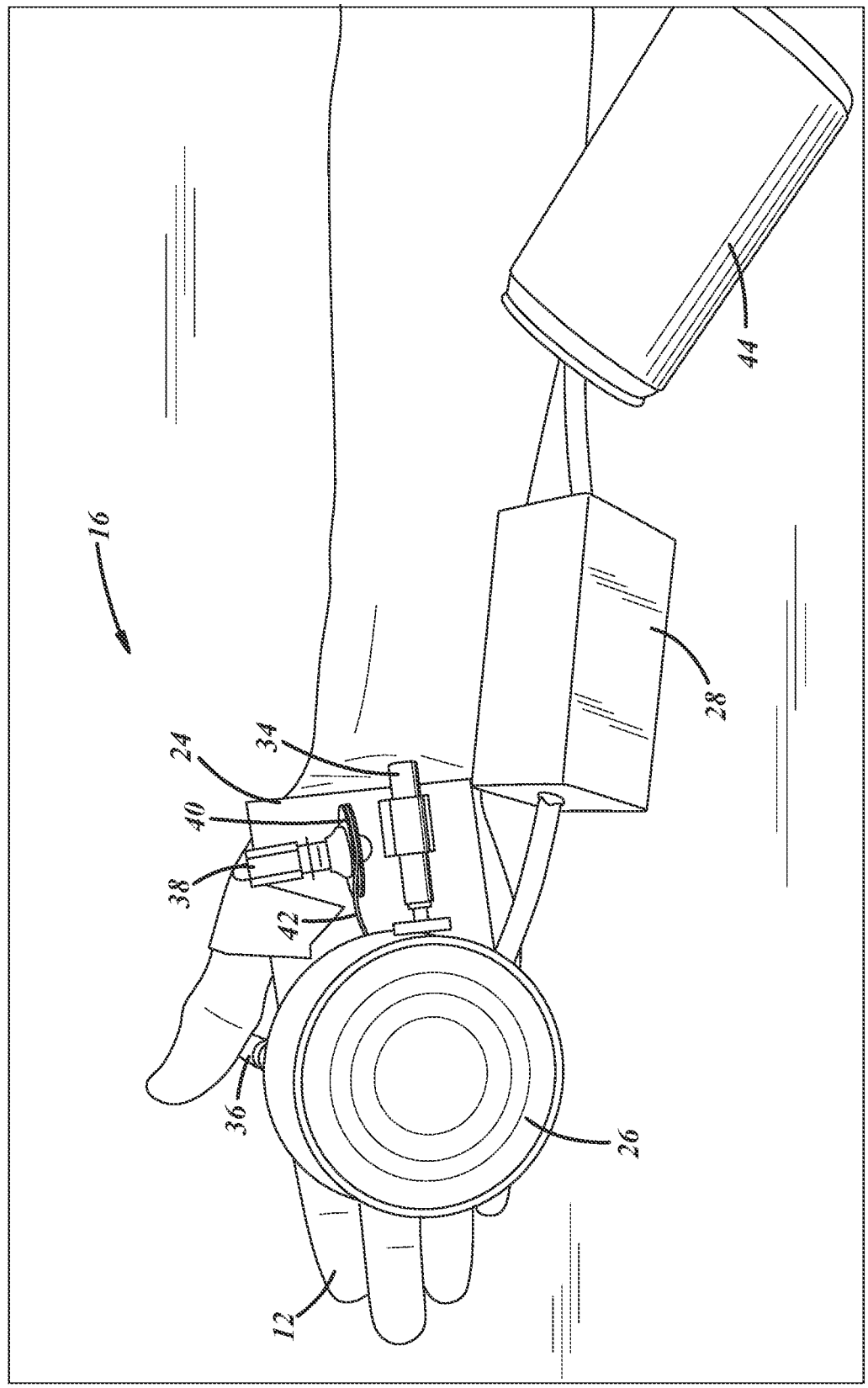

Referring now to FIGS. 2-3, device 16 is configured to be worn on body 12. In the illustrated embodiment, device 16 is sized and configured to be worn on the hand of body 12. It should be understood, however, that embodiments of device 16 could be configured to be worn on a variety of parts of the body including the head, torso, arms, legs or feet or on individual members of these parts (e.g., the fingers of a hand). Device 16 is configured to provide haptic feedback to body 12 indicative of interactions between a virtual body 12' and one or more virtual objects 22A, 22B within the virtual reality space 14. Device 16 may include a base 24, one or more containers 26, and one or more flow control devices 28. In certain embodiments, device 16 may further include magnets 30A, 30B, a linear guide 32, linear actuators 34, 36, a motor 38, a pulley 40 and a string 42.

Base 24 is provided to support certain components of device 16 including, depending on the embodiment, containers 26, flow control devices 28, magnets 30A, 30B, linear guide 32, linear actuators 34, 36, motor 38, pulley 40, and string 42, and to position and orient these components relative to one another. In the illustrated embodiment, base 24 is rigid and may be made from wood, carboard, metal or plastic. It should be understood, however, that base 24 may alternatively be made from flexible materials such that base 24 can conform to the portion of body 12 on which it is mounted (e.g., a glove for a hand). Base 24 is configured to be affixed to body 12. For example, tape may be used to secure base 24 to body 12. Alternatively, straps may be secured at each end to base 24 and wrap around body 12. In yet other embodiments, base may be configured to allow body 12 to be inserted within base 24 (e.g., a hand inserted into a glove).

Figure 4:
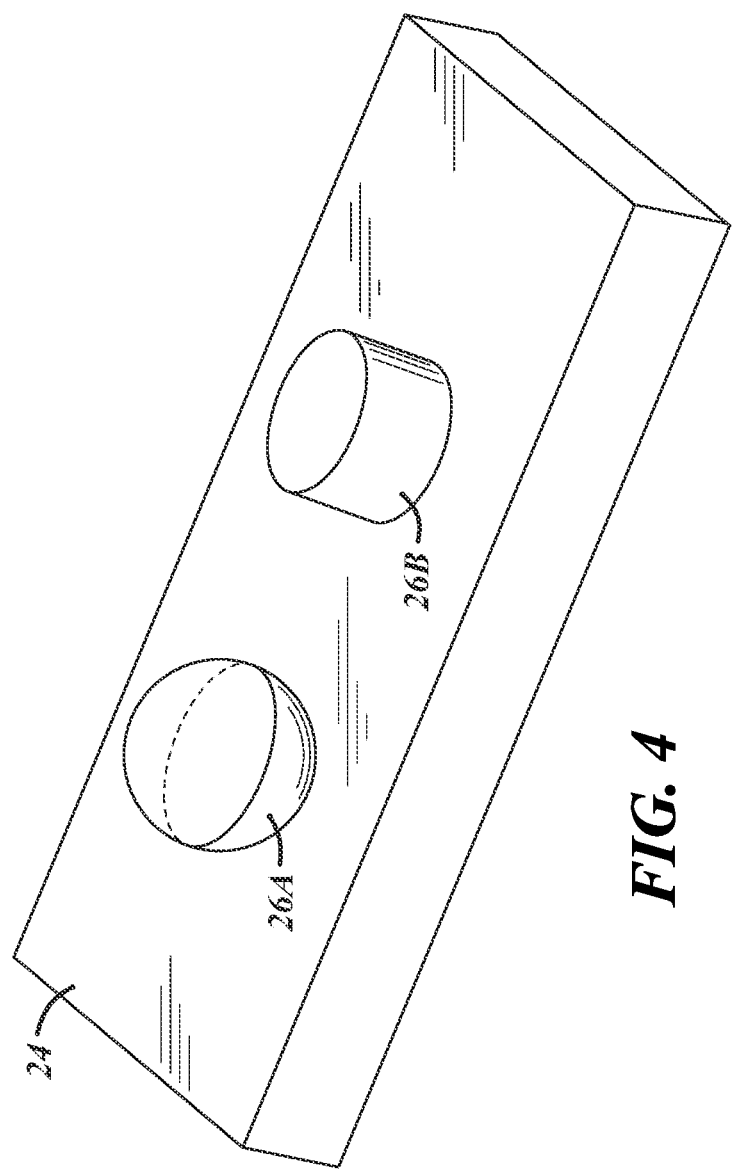
FIG. 4 is a perspective view of another embodiment of a wearable device for providing haptic feedback to the body of the living being indicative of interactions between a virtual body and one or more virtual objects within the virtual reality space in the system of FIG. 1.

Containers 26 may be supported on base 24. Containers 26 have a hollow interior that may be partially or fully filled with a mass to simulate certain effects resulting from interactions between virtual body 12' and virtual objects 22A, 22B within virtual space 14 such as the weight of a virtual object 22A, 22B or the size or shape of a virtual object 22A, 22B. In the illustrated embodiment, device 16 includes a single container 26 that is cylindrical in shape and made from a relatively rigid material such as a metal. Referring to FIG. 4, however, in accordance with one aspect of present teachings, device 16 may include one or more containers 26A, 26B that are configured to assume different shapes when filled with a mass. Each container 26A, 26B may be configured to assume an expanded state in which the container 26A, 26B assumes a defined shape when the mass is received within the container 26A, 26B and a contracted state in which the container 26A, 26B does not assume the defined shape when the mass is absent from the container 26A, 26B. In the illustrated embodiment, for example, container 26A may assume a spherical shape when filed with a mass to simulate grasping a spherical virtual object 22A with the virtual body 12' in the virtual reality space 14 while container 26B may assume a cylindrical shape when filled with a mass to simulate grasping a cylindrical object 22B with the virtual body 12' in the virtual reality space 14. It should be understood that the shapes of objects 22A, 22B and the corresponding shapes of containers 26A, 26B are exemplary only and that device 16 and containers 26 could be used to simulate a wide variety of shapes of virtual reality objects 22. In the illustrated embodiment, containers 26A, 26B are shown in the expanded state in which the containers 26A, 26B are filled (inflated) with the mass. When not filled with the mass (deflated), the containers 26A, 26B may assume the contracted state and an undefined shape and may overlap one another on base 24. In order to allow containers 26A, 26B to assume the expanded and contracted states, at least a portion of each container 26A, 26B may be made from an elastomeric material. In some embodiments, the container may be made entirely of elastomeric material. For example, container 26A may be made entirely from elastomeric materials to allow container 26A to expand in all directions to form a sphere. In another embodiment, however, a container may be configured to form a hemisphere. In this embodiment, the container would only need to expand in certain directions and may have a rigid base portion made from metals or hard plastics and an elastomeric membrane portion affixed to the base portion and capable of expanding to form a hemisphere. Container 26 B may include end portions made from metals or hard plastics and an elastomeric membrane portion affixed to the end portions and capable of expanding to form a cylinder. In yet other embodiments, one or more of containers 26A, 26B may be made entirely from materials other than elastomeric materials. Container 26B, for example, could include end portions made from metals or hard plastics and a bellows portion that is also made from rigid metals or hard plastics, but that is concertinaed or formed from a plurality of folds that are joined to one another and collapse on one another in the absence of the mass and align with one another to expand the space in the presence of the mass.

Referring again to FIGS. 2-3, flow control devices 28 are provided to control the flow of mass between containers 26 and one or more storage tanks 44. Although a single device 28 is shown in the illustrated embodiment, separate devices 28 may be provided for each container 26 mounted on base 24. Devices 28 are controlled by, and respond to flow control signals generated by, controller 18 responsive to interactions between virtual body 12' and virtual objects 22A, 22B in the virtual reality space 14. Devices 28 may comprise, for example valves or pumps. Device 28 may be supported on base 24 or may be remote from base 24. In the illustrated embodiment, device 28 is shown as a separate element from container 26 and tank 44 and coupled to each of container 26 and tank 44 through tubes. It should be understood, however, device 28 could be integrated with container 26 or tank 44 such that a single tube extends from device 28 to container 26 (when device 28 is integrated with tank 44) or from device 28 to tank 44 (when device 28 is integrated with container 26). The mass may comprise a fluid, a solid (e.g., beads), or a combination of fluids and solids. Tank 44 will be sized, configured and located depending on the type and volume of mass required to simulate different interactions within the virtual reality space 14 between the virtual body 12' and virtual objects 22A, 22B. In certain embodiments, tank 44 may be located above container 26 relative to earth ground to allow the mass to flow from tank 44 to container 26 under the force of gravity when flow control device 28 is opened or operating. Alternatively, tank 44 may be located below container 26 relative to earth ground to allow the mass to flow from container 26 to tank 44 under the force of gravity when flow control device 28 is opened or operating.

Magnets 30A, 30B are configured to locate container 26 on base 24 and to maintain container 26 on base 24 in cases where container 26 is made from magnetic materials. Magnets 30A, 30B generate a magnetic force that attracts and couples container 26 to base 24 in embodiments in which container 26 is made from a magnetic material. In the illustrated embodiment, there are two magnets 30A, 30B in a single row. It should be understood that the number and arrangement of magnets 30A, 30B may vary, however.

Linear guide 32 is provided to support container 26 on base 24 and to facilitate movement of container 26 along base 24. Linear guide 32 may include one or more rails and container 26 may be configured to ride along the rails, or on a carriage affixed to the rails, in response to an applied force in order to move container 26 back and forth along an axis. In some embodiments, a carriage may support magnets 30A, 30B. Guide 32 may be configured to move container 26 on an axis parallel to body 12 or towards and away from body 12 (e.g., as a ramp). In the illustrated embodiment, a single linear guide 32 is shown that permits movement of container 26 along an axis extending between the palm of the hand and the base of the fingers of the hand. It should be understood, however, that the number and orientation of linear guides 32 may vary. In particular, multiple linear guides may be used to, for example, permit movement of container 26 along perpendicular axes.

Linear actuators 34, 36 are provided to apply forces to cause movement of container 26 in order to simulate different interactions between virtual body 12' and virtual objects 22A, 22B in virtual reality space 14. Actuators 34, 36 may be supported on base 24 or be remote from base 24. Actuators 34, 36 are controlled by, and respond to actuator control signals generated by, controller 18 responsive to interactions between virtual body 12' and virtual objects 22A, 22B in the virtual reality space 14. Actuator 34 is provided to cause movement of container 26 relative to linear guide 32 and, in particular, back and forth along linear guide 32. This action may simulate, for example, the rolling of a spherical virtual object 22A along virtual body 12' or a shifting of weight. Actuator 36 is provided to uncouple container 26 from base 24. This action may simulate, for example, the action of dropping or releasing a virtual object 22A, 22B by virtual body 12' in the virtual reality space 14. Where magnets 30A, 30B help to secure container 26 to base 24, actuator 36 may apply a force to container 26 opposing the magnetic force generated by magnets 30A, 30B and sufficient to overcome the magnetic force coupling container 26 to base 24. Actuators 34, 36 may include pushrods that engage container 26 in appropriate locations and may support magnets on the end of the pushrods engaging container 26 when container 26 is made from a magnetic material.

Motor 38, pulley 40 and string 42 provide a means for returning container 26 to base 24 if container 26 is uncoupled from base 24. Motor 38 is controlled by, and responds to motor control signals generated by, controller 18 responsive to interactions between virtual body 12' and virtual objects 22A, 22B in the virtual reality space 14. Pulley 40 is supported on an output shaft of motor 38 and is rotatably driven by motor 38. String 42 has one end coupled to container 26 and a second end coupled to pulley 40 and is wound about pulley 40. If container 26 is uncoupled from base 24, motor 38 may be controlled by controller 18 to cause rotation of pulley 40 and winding of string 42 to return container 26 to base 24 to, for example, simulate picking up a virtual object 22A, 22B by virtual body 12' in virtual reality space 14.

Referring again to FIG. 1, controller 18 is provided to generate control signals for components of wearable device 16 in order provide haptic feedback to body 12 indicative of interactions between virtual body 12' and one or more virtual objects 22A, 22B within virtual reality space 14. In certain embodiments, controller 18 may be further configured to receive signals from wearable device 16 indicative of the position or movement of body 12 and to generate signals to control the position or movement of virtual body 12' in virtual reality space 14 in response. Controller 18 may comprise a programmable microprocessor or microcontroller or may comprise an application specific integrated circuit (ASIC). In certain embodiments, controller 18 may include a memory, a central processing unit (CPU), and an input/output (I/O) interface including a plurality of input/output pins or terminals through which controller 18 may receive a plurality of input signals and transmit a plurality of output signals. The input signals may include signals from sensors (not shown) on wearable device 16 indicative of the position or movement of body 12. The output signals may include signals used to control components of wearable device 16 including flow control signals used to control flow control devices 28, actuator control signals used to control linear actuators 34, 36 and motor control signal used to control motor 38. The output signals may further include display control signals used to control display 20 and the position and movement of virtual body 12' and virtual objects 22A, 22B within virtual reality space 14.

Display 20 provides a visualization of the virtual reality space 14. Display 20 may comprise a conventional monitor or screen or virtual reality headset or a projector any of which may be configured to generate two-dimensional or three-dimensional images representing virtual reality space 14. Display 20 may be controlled by display control signals generated by controller 18.

A system 10 for transmitting signals between a body 12 of a living being and a virtual reality space 14 in accordance with the present teachings represents an improvement as compared to conventional systems. In particular, the system 10 is made from relatively simple and inexpensive components thereby facilitating faster adoption and use of virtual reality systems in various fields and/or increased access to such systems.

While the invention has been shown and described with reference to one or more particular embodiments thereof, it will be understood by those of skill in the art that various changes and modifications can be made without departing from the spirit and scope of the invention.

What is claimed is:

1. A system for transmitting signals between a body of a living being and a virtual reality space, comprising:
    a wearable device configured to be worn on the body of the living being, the wearable device configured to provide haptic feedback to the body of the living being indicative of interactions between a virtual body and one or more virtual objects within the virtual reality space, the wearable device including
        a base configured to be affixed to the body of the living being;
        a first container supported on the base; and,
        a first flow control device configured to control flow of a first mass between the first container and a first tank; and,
    a controller configured to generate a first flow control signal to control the first flow control device responsive to a first interaction between the virtual body and a first virtual object within the virtual reality space
    wherein the first container is configured to assume an expanded state in which the first container assumes a first defined shape corresponding to a shape of the first virtual object when the first mass is received within the first container and a contracted state in which the first container does not assume the first defined shape when the first mass is absent from the first container.

2. The system of claim 1 wherein at least a portion of the first container is made from an elastomeric material.

3. The system of claim 1 wherein the flow control device comprises a valve.

4. The system of claim 1 wherein the flow control device comprises a pump.

5. The system of claim 1 wherein the first mass comprises a liquid.

6. The system of claim 1 wherein the first mass consists of a solid.

7. The system of claim 1 wherein the first mass comprises a liquid and a solid.

8. The system of claim 1 wherein the wearable device further includes
    a linear guide supporting the first container on the base; and,
    a linear actuator supported on the base and configured to cause movement of the first container relative to the linear guide in response to an actuator control signal generated by the controller responsive to one of the first interaction and a second interaction between the virtual body and one of the first virtual object a second virtual object within the virtual reality space.

9. The system of claim 1 wherein the wearable device further includes
   a magnet generating a magnetic force that couples the first container to the base; and,
   a linear actuator supported on the base and configured to apply a force to the first container opposing the magnetic force in response to an actuator control signal generated by the controller responsive to one of the first interaction and a second interaction between the virtual body and one of the first virtual object a second virtual object within the virtual reality space.

10. The system of claim 1 wherein the wearable device further includes
    a motor; and,
    a pulley rotatably driven by the motor responsive to a motor control signal generated by the controller responsive to one of the first interaction and a second interaction between the virtual body and one of the first virtual object a second virtual object within the virtual reality space; and,
    a string having a first end supported on the pulley and a second end coupled to the first container.

11. The system of claim 1 wherein the wearable device further includes
    a second container supported on the base; and,
    a second flow control device configured to control flow of a second mass between the second container and one of the first tank and a second tank in response to a second flow control signal generated by the controller responsive to a second interaction between the virtual body and a second virtual object within the virtual reality space, the second virtual object different from the first virtual object
    wherein the second container is configured to assume an expanded state in which the container assumes a second defined shape different from the first defined shape when the second mass is received within the second container and a contracted state in which the second container does not assume the second defined shape when the second mass is absent from the first container.

12. A wearable device for providing haptic feedback to the body of the living being indicative of interactions between a virtual body and one or more virtual objects within a virtual reality space, the wearable device, comprising:
    a base configured to be affixed to the body of the living being;
    a first container supported on the base; and,
    a first flow control device configured to control flow of a first mass between the first container and a first tank in response to a first flow control signal generated in response to a first interaction between the virtual body and a first virtual object within the virtual reality space
    wherein the first container is configured to assume an expanded state in which the first container assumes a first defined shape corresponding to a shape of the first virtual object when the first mass is received within the first container and a contracted state in which the first container does not assume the first defined shape when the first mass is absent from the first container.

13. The system of claim 12 wherein at least a portion of the first container is made from an elastomeric material.

14. The wearable device of claim 12 wherein the flow control device comprises a valve.

15. The wearable device of claim 12 wherein the flow control device comprises a pump.

16. The wearable device of claim 12 wherein the first mass comprises a liquid.

17. The wearable device of claim 12 wherein the first mass consists of a solid.

18. The wearable device of claim 12 wherein the first mass comprises a liquid and a solid.

19. The wearable device of claim 12, further comprising:
    a linear guide supporting the first container on the base; and,
    a linear actuator supported on the base and configured to cause movement of the first container relative to the linear guide in response to an actuator control signal generated in response to one of the first interaction and a second interaction between the virtual body and one of the first virtual object a second virtual object within the virtual reality space.

20. The wearable device of claim 12, further comprising:
    a motor; and,
    a pulley rotatably driven by the motor responsive to a motor control signal generated in response to one of the first interaction and a second interaction between the virtual body and one of the first virtual object a second virtual object within the virtual reality space; and,
    a string having a first end supported on the pulley and a second end coupled to the first container.

21. The wearable device of claim 12, further comprising:
    a second container supported on the base; and,
    a second flow control device configured to control flow of a second mass between the second container and one of the first tank and a second tank in response to a second flow control signal generated in response to a second interaction between the virtual body and a second virtual object within the virtual reality space, the second virtual object different from the first virtual object
    wherein the second container is configured to assume an expanded state in which the container assumes a second defined shape different from the first defined shape when the second mass is received within the second container and a contracted state in which the second container does not assume the second defined shape when the second mass is absent from the first container.

22. A wearable device for providing haptic feedback to the body of the living being indicative of interactions between a virtual body and one or more virtual objects within a virtual reality space, the wearable device, comprising:
    a base configured to be affixed to the body of the living being;
    a first container supported on the base; and,
    a first flow control device configured to control flow of a first mass between the first container and a first tank in response to a first flow control signal generated in response to a first interaction between the virtual body and a first virtual object within the virtual reality space
    wherein the first container is configured to assume an expanded state in which the first container assumes a first defined shape when the first mass is received within the first container and a contracted state in which the first container does not assume the first defined shape when the first mass is absent from the first container
    a magnet generating a magnetic force that couples the first container to the base; and,
    a linear actuator supported on the base and configured to apply a force to the first container opposing the magnetic force in response to an actuator control signal generated in response to one of the first interaction and a second interaction between the virtual body and one of the first virtual object a second virtual object within the virtual reality space.

\* \* \* \* \*